United States Patent [19]

Ohnishi et al.

[11] 3,890,284
[45] June 17, 1975

[54] TRIMELLITOYL FUNCTIONAL POLYMERS, MANUFACTURING PROCESS THEREFOR AND ELASTOMERIC EPOXY COMPOSITIONS CURED THEREWITH

[75] Inventors: Akira Ohnishi; Toshio Yukuta; Ryota Fujio; Yozo Ishida; Shu Kambara; Minoru Kojima, all of Tokyo, Japan

[73] Assignee: Bridgestone Tire Company Limited, Tokyo, Japan

[22] Filed: Aug. 13, 1973

[21] Appl. No.: 387,590

Related U.S. Application Data

[63] Continuation-in-part of Ser. Nos. 143,643, May 14, 1971, abandoned, Continuation-in-part of Ser. No. 143,645, May 14, 1971, abandoned.

[30] Foreign Application Priority Data

May 15, 1970 Japan............................. 45-40900
May 15, 1970 Japan............................. 45-40899

[52] U.S. Cl.. 260/78.4 EP; 260/23 EP; 260/78.4 D; 260/88.2; 260/346.3; 260/346.6; 260/836 R; 260/837 R
[51] Int. Cl............................................. C08g 30/12
[58] Field of Search....... 260/836 R, 837 R, 78.4 D, 260/78.4 EP, 835, 88.2, 346.3, 346.6, 23 EP

[56] References Cited
UNITED STATES PATENTS

| | | | |
|---|---|---|---|
| 2,824,142 | 2/1958 | Gardner et al...................... | 260/638 |
| 2,829,130 | 4/1958 | Greenspan et al.................. | 260/82.1 |
| 2,862,911 | 12/1958 | Blanchette........................... | 260/63 |
| 3,140,299 | 7/1964 | Loncrini............................... | 260/78.4 |
| 3,182,073 | 5/1965 | Loncrini............................... | 260/346.3 |
| 3,234,197 | 2/1966 | Baum................................... | 260/93.7 |
| 3,336,251 | 8/1967 | Manasia............................... | 260/78.4 |
| 3,525,720 | 8/1970 | Wismer et al........................ | 260/80.5 |
| 3,555,111 | 1/1971 | Benham............................... | 260/835 |
| 3,609,110 | 9/1971 | Chofu-shi............................. | 260/29.7 |

*Primary Examiner*—Eugene C. Rzucidlo
*Attorney, Agent, or Firm*—Waters, Schwartz & Nissen

[57] ABSTRACT

A new functional polymer having trimellitoyl groups and having the formula

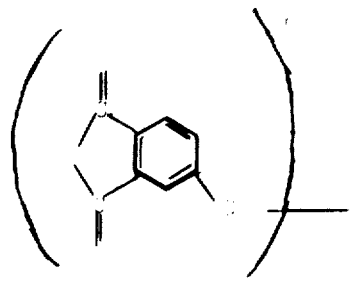

in which R is a homo - or co-polymeric conjugated diene radical having rubber-like elasticity and having an average molecular weight of from 700 to 30,000 and $n$ is an integer of at least 2 is prepared by ozonizing a homopolymer or copolymer of a conjugated diene to form a hydroxy-functional polymer having an average molecular weight of 700 to 30,000 and at least two hydroxyl groups and reacting the hydroxyl-functional polymer with a monohalide of trimellitic anhydride. The new polymer may be used to cure epoxy compounds at a temperature of 50°C to 300°C, to form cured elastomeric products.

21 Claims, No Drawings

TRIMELLITOYL FUNCTIONAL POLYMERS, MANUFACTURING PROCESS THEREFOR AND ELASTOMERIC EPOXY COMPOSITIONS CURED THEREWITH

CROSS-REFERENCE TO RELATED APPLICATIONS

This application is a continuation-in-part application of Ser. No. 143,643, and Ser. Number 143,645, both filed on May 14, 1971 and both now abandoned.

BACKGROUND OF THE INVENTION

The invention relates to a novel trimellitoyl functional polymer, a process for producing it and the elastomeric cured products obtained by reacting the novel polymer with epoxy compounds at an elevated temperature.

Compounds having a molecular chain of a lower molecular weight aliphatic or aromatic compound, to which chain are linked two or more trimellitoyl groups, are already known as disclosed for instance in U.S. Pat. No. 3,182,074 and Belgian Pat. No. 631,374. These known compounds were, however, limited to merely those whose basic molecular chain corresponding to R in said formula of the invention is of an average molecular weight lower than 200.

It is well known that a polyepoxy compound or epoxy resin having two or more epoxy groups in each molecule thereof can be reacted with a hardener, a polycarboxylic acid such as maleic acid, phthalic acid or an anhydride thereof to form a hardened corresponding epoxy resin having improved mechanical, thermal and electrical properties. The epoxy resins thus hardened are superior to those hardened with a polyamine hardener in electrical insulating properties as well as heat resistance and more particularly in having a small exothermic property, so that the hardened epoxy resins of the former type have been advantageously used in various fields, above all for the larger dimension molded articles. Even such hardened epoxy resins, however, have an important and inevitable disadvantage in their poor flexibility or elasticity.

According to another aspect, thus, the invention may be said to lie in overcoming such faults inevitable in the conventionally hardened epoxy resins by using the novel trimellitoyl-functional polymer as hardener to considerably extend the uses of epoxy resins.

SUMMARY OF THE INVENTION

The invention relates to a new functional polymer having trimellitoyl groups, i.e., phthalic anhydride-4-carbonyl groups and represented by

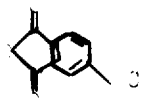

at two or more ends of the molecule and more particularly to a polymer represented by the formula,

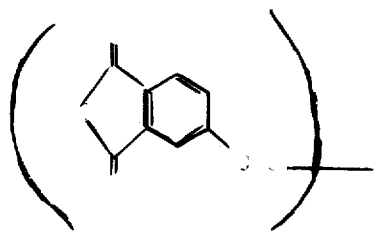

in which R is a homo- or co-polymeric conjugated diene radical having rubber-like elasticity and having a molecular weight of from 700 to 30,000, and $n$ means an integer at least 2, as well as a process for the manufacture thereof. The molecular weight of said basic part R is preferably lower than 30,000 in a view of the fact that the new polymer is used as an intermediate to be reacted with other functional compounds for the purpose as referred to above.

The new polymer according to the invention can be manufactured by 1. ozonizing a high polymer compound comprising 2 – 100 weight % olefin unsaturated double bond units,
2. reducing the resulting polymer ozonide to form a hydroxyl-functional polymer having an average molecular weight of at least 700, and
3. reacting the resulting hydroxyl-functional polymer with trimellitic anhydride or a derivative thereof.

The new polymer of the invention is functional and can be readily reacted with any relevent functional compound, such as an amine or epoxide, with utilization of the reactivity of the acid anhydride group of said trimellitoyl group so as to proceed with the molecular chain extension and cross linking to form an elastomer having a three dimensional cross-linked structure. Thus such functional polymer is very useful as a material for preparing paint, adhesives, molded articles, synthetic resins, synthetic rubber as for tires, binders for solid rocket fuels, industrial coating materials, or articles of complex configuration.

DESCRIPTION OF THE PREFERRED EMBODIMENTS

In preparing the polymers according to the invention, the material to be ozonized is a homopolymer or co-polymer of such nature as referred to above and shall be designated hereinafter as material polymer. The material polymer is preferably a conjugated diene homo-polymer or copolymer in the liquid or solid state, whose molecular weight may be selected at will. Even if the material polymer is of higher molecular weight in the order of 10,000 to 100,000, the molecular weight may be readily controlled according to the invention to prepare the hydroxyl-functional polymer of 700 to 30,000 molecular weight. As the monomers to constitute said material polymer, there are conjugated dienes such as butadiene, isoprene, 1,3-pentadiene, 1,3-hexadiene, 2,3-dimethylbutadiene; α-olefins such as ethylene, propylene, isobutylene, butene-1, pentene-1 and hexene-1, styrene, α-methylstyrene, vinylnaphthalene, acrylic ester, methacrylic ester, acrylonitrile, methacrylonitrile, vinylidene chloride, methyl vinyl ketone, butyl vinyl ether, vinyl carbazole, vinyl furan, vinylpyridine and the like, among which conjugated dienes of 4 to 8 carbon atoms, α-olefins of two to six carbon atoms, styrene and acrylonitrile are preferred. Above all butadiene, isoprene, ethylene, propylene, isobutylene, styrene and acrylonitrile are the most preferred.

Such material polymer is firstly ozonized according to the invention, in which ozonization may be carried out by contacting the material with ozone gas, and more preferably by passing a gaseous medium containing ozone through a solution of the material polymer in a solvent inert to ozone, at a temperature ranging from room temperature down to −80°C. Not only the ozonizing step but also the subsequent reduction step is carried out preferably in the liquid phase, and thus as the solvent for said ozonization it is desirable to use any of the hydrocarbon halides and aromatic hydrocarbons, in which both the material polymer and the ozonide are soluble, but aliphatic hydrocarbons, alicyclic hydrocarbons and various ethers may also be used.

Then the resulting polymer ozonide is subjected to reduction in the presence of a strong reducing agent, which is preferably a metal hydride such as lithium hydride (LiH), aluminum hydride (AlH$_3$), lithium aluminum hydride (LiAlH$_4$), sodium borohydride (NaBH$_4$). The reduction is preferably carried out in a solution of the polymer ozonide cooled down below room temperature into which the reducing agent is added in excess, the reaction mixture being then warmed so that the polymer ozonide is reduced. Generally every material polymer can be converted to a hydroxyl-functional polymer so far as said material contains an olefinic unsaturated double bond.

The resulting relatively lower molecular weight hydroxy-functional polymer is finally reacted with trimellitic anhydride or a derivative thereof to form the new functional high polymer of the invention. The derivative of trimellitic anhydride is a halide or ester. When reacting not with the derivative but with the anhydride itself, the hydroxyl-functional polymer may be in the form of an ester such as the acetic ester. The reaction may be represented by the following;

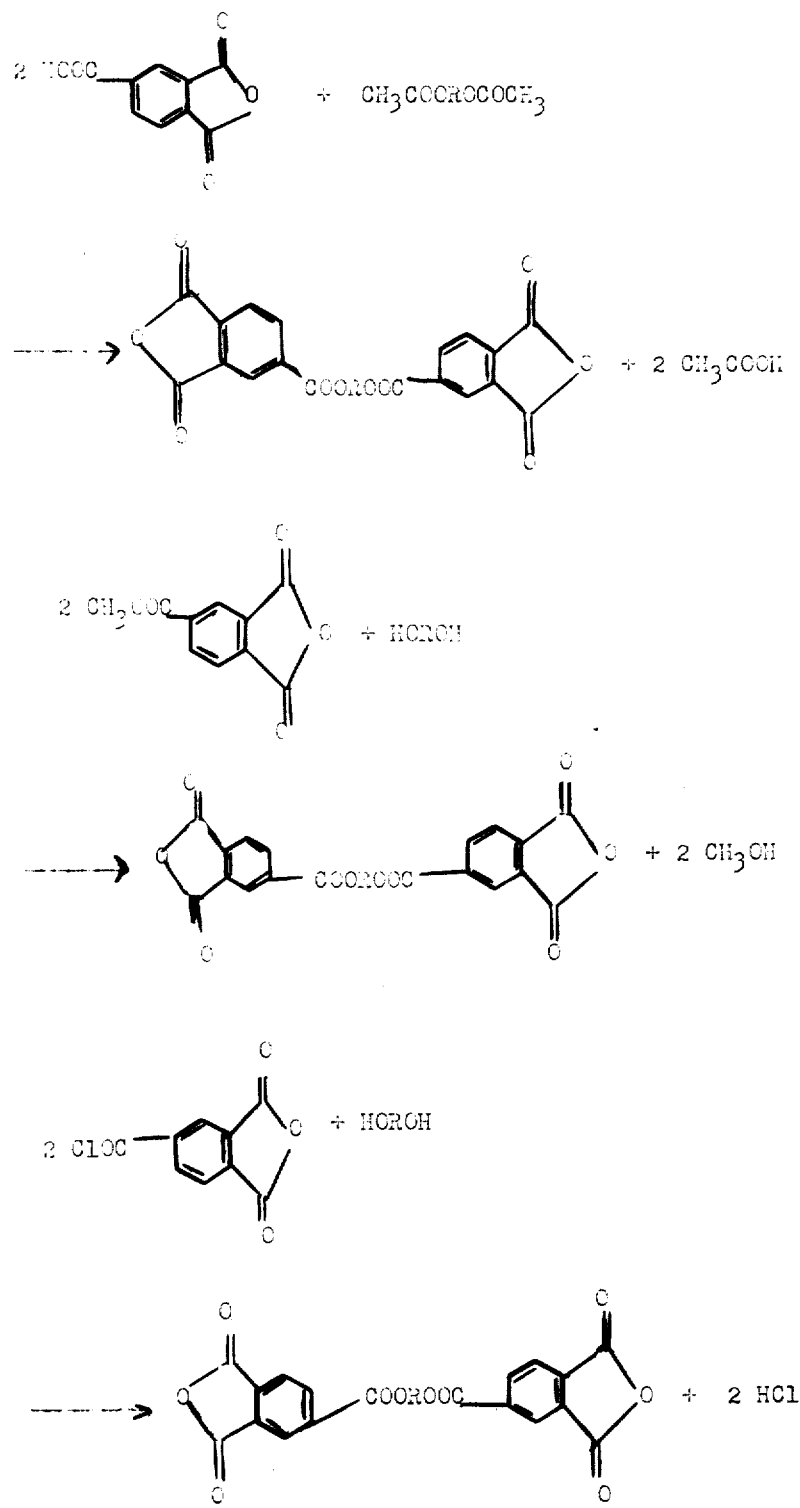

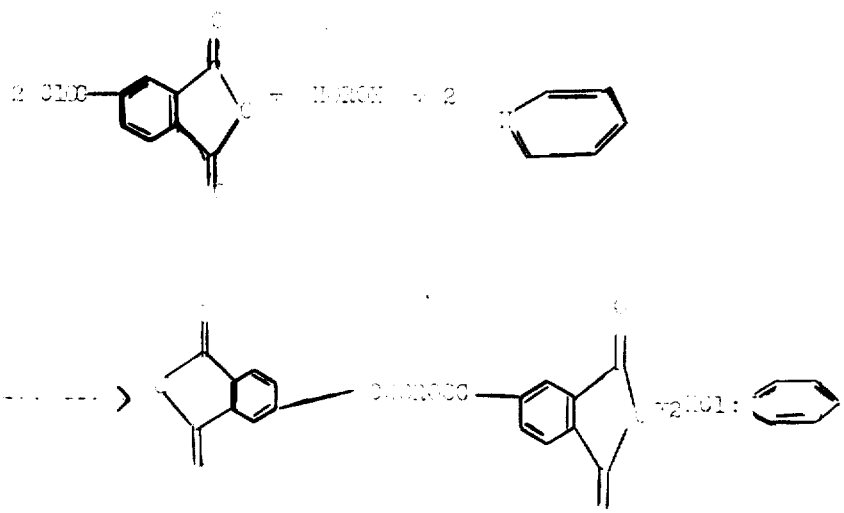

R has the same meaning as referred to in said formula.

The reaction may be carried out without a solvent but is preferably carried out in the liquid phase using a solvent inert to the materials, resulting polymer and any other additives. As such solvents, straight chain or cyclic ethers such as ethyl ether, tetrahydrofuran, dioxane; aromatic compounds such as benzene, toluene; paraffinic or cycloparaffinic compounds such as pentane, hexane, heptane, cyclohexane are used. The reaction temperature ranges perferably from 150° to 250°C when using trimellitic anhydride or an ester thereof, and from room temperature to 150°C when using a halide of trimellitic anhydride. The reactants may be used in the respective theoretical amount, but it is preferably to use trimellitic anhydride or the derivative thereof slightly in excess so as to facilitate the reaction in a high yield. So far as the reaction with the halide of trimellitic anhydride is concerned, it has been found that the reaction can be carried out considerably more quickly at the lower temperature when using a tertiary amine as the acid acceptor. As the tertiary amine, triethylamine, tri-(n-butyl)-amine, pyridine, quinoline, isoquinoline are enumerated, anong which pyridine and quinoline are more preferable. In this case the reaction temperature is −50°C to +5°C, and more preferably −30°C to −10°C. The halide of trimellitic anhydride also is used preferably in a slight excess relative to the theoretical value for the reaction in a high yield.

The hydroxyl group of the hydroxyl-functional polymer is reactive to both the carbonyl group and the acid anhydride group of trimellitic anhydride or of the derivative thereof. In order to obtain the terminal trimellitoyl-functional high polymer, said hydroxyl group must be reacted selectively with the carbonyl group but not with the acid anhydride group. For satisfying the condition, the best method is to use a halide of trimellitic anhydride and carry out the reaction in the presence of an acid acceptor. The reactiveness of the hydroxyl group with the acylhalide group is stronger than that with the acid anhydride group, and thus the hydroxyl group can selectively react with the acylhalide group at the lower temperature so as to effectively form the objective trimellitoyl-functional high polymer compound.

As referred to above the process of the invention comprises three steps, in each of which the reaction is preferably carried out in the liquid phase. Of course it is possible to separate the reaction product from the mixture solution to be purified and dried and subject said product to the subsequent reaction in the same or other solvent. It is possible and would be preferable, however, to proceed with the ozonizing, ozonide reducing and trimellitic anhydride esterifying steps all in liquid phase with the same solvent from the beginning to the end. The compromise methods are also taken into consideration as falling under the scope of the invention.

It has been found that the functional high polymer having trimellitoyl groups, which is prepared by ozonizing the starting material, then reducing the resulting ozonide and finally esterifying the resulting hydroxyl-functional polymer with trimellitic anhydride as referred to, has substantially the same microstructure as that of the starting material high polymer. For instance when using polybutadiene of 96 mole % cis-1,4 structure as starting material, the objective functional polymer was found to still contain 94 mole % cis-1,4 structure. And consequently if the starting material is a high polymer of high stereoregularity then the resulting relatively lower molecular weight trimellitoyl-functional polymer would have substantially the same stereoregularity. This has first been made possible according to the invention by the ozonolysis treatments, namely ozonization and reduction of the ozonide. This invention is useful particularly when using such a highly sterospecific polymer as the starting material.

The invention shall be explained in more detail in the following Examples which are given not for limiting the scope of the invention thereto but merely for explanation:

EXAMPLES 1 – 3

High cis-1,4-polybutadiene (95.6 mole % cis-1,4 content, 2.7 mole % trans-1,4 content and 1.7 mole % trans-1,2 content; [$\eta$] * = 2.0, 48 weight % olefin unsaturated double bond units) available commercially was ozonized and then subjected to reduction using such a reducing agent as specified in the following table so that three classes of polybutadiene glycol were obtained. Structural characteristics of each of the lots is shown in Table 1.

Table 1

| Lot No. | OZ-60 | OZ-66 | OZ-67 |
|---|---|---|---|
| Characteristics | | | |
| Reducing agent | LiAlH$_4$ | NaBH$_4$ | NaBH$_4$ |
| [η] * | 0.15 | 0.20 | 0.31 |
| Average mol. wt.** | 1520 | 1790 | 1760 |
| Equivalent mol. wt.*** | 850 | 900 | — |
| Functionality (f) **** | 1.8 | 2.0 | — |
| Microstructure (cis-1,4-mole %) | 95–97 | 95–97 | 95–97 |

\* Determined in toluene at 30°C
\*\* Determined according to VPO method
\*\*\* Molecular weight per each hydroxyl group
\*\*\*\*(f) Ratio of number average molecular weight to equivalent molecular weight Each of said polybutadiene glycols was respectively taken together with trimellitic anhydride monochloride and benzene into a reaction flask to be heated at a temperature of 60°C with agitating and with blowing nitrogen gas thereinto so as to get rid of the resulting hydrogen chloride. After the lapse of a predetermined time to be referred to hereinafter the heating was stopped to distill off most of the benzene from the reaction mixture. To the residue was added cyclohexane in a large amount to remove the insoluble and unreacted substance so as to obtain the high molecular weight ester having substantially two trimellitoyl groups as a light brown viscous liquid. In Table 2 the synthesizing conditions and results of said three Examples are given.

Table 2

| Example No. | 1 | 2 | 3 |
|---|---|---|---|
| Conditions and results | | | |
| Hydroxyl-functional polybutadiene | OZ - 66 | OZ - 60 | OZ - 67 |
| Amount thereof used (gr) | 50 | 110 | 50 |
| Trimellitic anhydride monochloride (gr) | 18 | 32 | 14.4 |
| Reaction time (hrs) | 16 | 18 | 15 |
| Benzene (ml) | 500 | 1200 | 600 |
| Yield (gr) | 55 | 118 | 49 |
| Yield (%) | 89 | 89 | 82 |
| Bulk viscosity (cps) | — | 140 | — |
| [η] * | 0.17 | 0.20 | 0.34 |
| Number av. mol. wt. ** | 1400 | 2000 | 1580 |
| Butadiene cis-1,4 content (%) | 93 | 94 | 94 |

\* Determined in toluene at 30°C
\*\* Determined according to VPO method

The resulting functional polymer obtained in every Example was subjected to infrared analysis and there were observed in every case not only the absorption of anhydrous ring CO-bonding in the vicinity of 1,780 cm$^{-1}$ but also the absorption due to ester CO-bonding in the vicinity of 1,740 cm$^{-1}$.

EXAMPLES 4 – 6

A similar high cis-1,4-polybutadiene was ozonized and then subjected to reduction using sodium borohydride (NaBH$_4$) so as to obtain hydroxyl-functional polybutadiene (OZ-68) of the following structure;

| | |
|---|---|
| Number average molecular weight (VPO method) | 2600 |
| [η] (in toluene at 30°C) | 0.23 |
| Hydroxyl content | 0.175 equivalent per 100 gr. |
| Functionality (f) | 2.1 |
| Cis-1,4 content | 93 mole % |

The solution of the hydroxyl functional polymer (OZ-68) in the amount of 130 gr. in 600 ml of a solvent which shall be specified hereinafter was taken into the reaction flask held in the methanol bath at a temperature ranging from −10°C to −30°C. Into said solution was dropped with vigorous agitation a solution of trimellitic anhydride monochloride in the amount to be referred hereinafter in 200 ml of solvent and a solution of 7.9 gr. pyridine in 150 ml of solvent respectively via each of two dropping funnels so that both additions were concurrently completed in 45 minutes. After further continuation of the agitation for 2 hours until the bath temperature was gradually raised up to the room temperature, the insoluble part (pyridine-hydrogen chloride) was filtered off to dissolve the reaction product in 400 ml cyclohexane. The insoluble part consisting of unreacted trimellitic anhydride monochloride etc., was removed and cyclohexane was distilled off to obtain the desired compound as a light brown viscous liquid.

The synthesis conditions and results are shown in Table 3.

Table 3

| Example No. | 4 | 5 | 6 |
|---|---|---|---|
| Conditions & results | | | |
| Solvent | Toluene | Toluene | Ether |
| Trimellitic anhydride monochloride (gr) | 25.2 | 30.0 | 21.0 |
| Yield (gr) | 135 | 128 | 128 |
| Yield (%) | 88 | 85 | 85 |
| Acid anhydride Content (m mol/100 gr)* | 69.2 | 62.2 | — |
| Equivalent mol. wt. ** | 1440 | 1605 | — |

\* Determined by using Rat-1 type auto titration apparatus with 0.1 N-sodium methoxide solution of benzene/methanol (3/1 volume ratio)
\*\* Molecular weight per one trimellitoyl group The resulting functional polymer in every example was subjected to infrared analysis to confirm that there were observed in every case not only the absorption of anhydrous ring CO-bonding in the vicinity of 1,780 cm$^{-1}$ but also the absorption due to the ester CO-bonding in the vicinity of 1,740 cm$^{-1}$. It was confirmed also that the absorption observed in the vicinity of 3350 cm$^{-1}$ due to the polybutadiene glycol containing hydroxyl groups had completely disappeared in the final product.

EXAMPLE 7

Solution-polymerization styrene-butadiene rubber having 36 weight % olefin unsaturated double bond units commercially available was ozonized and then subjected to reduction using sodium borohydride (NaBH$_4$) so as to obtain the hydroxyl-functional styrenebutadiene rubber (OZ-69) of the structure to be referred to hereinafter.

| | |
|---|---|
| Number average mol. wt. (V.P.O. method) | 3170 |
| [η] (in toluene at 30°C) | 0.17 |
| Equivalent mol. wt. | 1495 |
| Functionality (f) | 2.1 |
| Styrene content (wt.%) | 25.0 |

The solution of the hydroxyl-functional polymer (OZ-69) in the amount of 77 gr. and 4 gr. of pyridine in 300 ml ether was poured into the reaction flask held in a methanol bath at a temperature of −20°C to −33°C. Into said solution was added with vigorous agitation a solution of 10.5 gr. trimellitic anhydride monochloride in 120 ml ether and 20 ml toluene in 40 minutes. The agitation was continued for another 1.5 hours so that the bath temperature was raised gradually up to the room temperature. The insoluble part (pyridine-hydrogen chloride) was filtered off and ether was distilled off to obtain the desired polymer compound in the form of a light brown viscous liquid.

| | |
|---|---|
| Yield (gr.) | 87.5 |
| Yield (%) | 99 |
| Acid anhydride content (m mol/100 gr) | 51.0 |
| Equivalent mol. wt. | 1960 |

The rubber-like elastomer prepared by mixing an epoxy compound having at least one epoxy group with a trimellitoyl-functional polymer such as cis-polybutadiene having trimellitoyl groups at the molecular chain ends and/or the side chains thereof and heating the mixture to be hardened according to the invention, has been found to show far more excellent rubber-like elasticity than epoxy resins hardened with a trimellitoyl-functional polybutadiene similar to the above but prepared by reacting a so-called living polybutadiene having an alkali metal such as sodium in the terminal group or a known hydroxyl terminated-polybutadiene manufactured according to the conventional method, with trimellitic anhydride. This is not limited only to said cis-polybutadiene but is true also for cis-polyisoprene, butyl rubber, styrene-butadiene rubber and other like synthetic rubbers, so far as is used such trimellitoyl-functional polymer as prepared by ozonolysis, namely ozonization of the material polymer and reduction of the resulting polymer ozonide according to the process of the invention.

It has also been found in this occasion that the esterification step using the halide of trimellitic anhydride in the presence of the acid acceptor is more preferable for forming the desirable trimellitoyl-functional polymer to be used as the first reactant in the invention for obtaining an elastomer of considerably higher elasticity. In fact it has been confirmed that the objective elastomer or hardened epoxy resin prepared using such trimellitoyl-functional polymer as manufactured by esterifying the hydroxyl-functional polymer in the presence of the acid acceptor has far lesser material soluble in the solvent at elevated temperatures and is far more completely gelated in view of the infrared absorption spectrum and the like. Acetic acid, hydrochloric acid etc., by-produced during the reactions for obtaining the trimellitoyl-functional polymer would play a role as a sort of catalyst poison to the reaction of said polymer with the epoxy compound. For instance hydrogen chloride was observed to exist in the amount of 20 to 50 m mole per 100 gr. of the trimellitoyl-functional polymer to be used as first reactant in the invention when said polymer was prepared from the hydroxyl-functional polymer in the absence of the acid acceptor, but it could be completely removed or eliminated down to 0.05 m mole when using pyridine as acid acceptor. It should be also referred to as a further advantage of using the acid acceptor for preparing the trimellitoyl-functional polymer as first reactant that the tertiary amine to be used as acid acceptor would form corresponding salts with said acids which salts act as a sort of desirable catalyst for the reaction of said functional polymer with said epoxy compound.

The trimellitoyl-functional polymers as prepared through the steps referred to above may be used in combination of two or more thereof as the first reactant.

The second reactant in the invention is an epoxy compound having at least one epoxy group and capable of forming stable polyester bonding upon the reaction with the trimellitoyl-functional polymer. The epoxy compound must have a relatively higher boiling point lest it should be evaporated when subjected to the heating treatment for forming the elastomer together with said first reactant according to the invention.

Examples of such epoxy compounds having one epoxy group, are in general higher alkylene oxides, halogenated alkylene oxides such as epichlorohydrin, alicyclic epoxides, alkyl glycidyl ethers, glycidyl esters such as glycidyl acrylate. In addition thereto styrene oxide, butadiene monoxide, epoxy stearate etc., also may be enumerated as the epoxy compound to be used.

As for compounds having two epoxy groups and falling under the category of the epoxy compounds in the invention, there are bisphenol A type epoxy resin, side chain type epoxy resin, dimer acid-diglycidyl ester, polyalkylene ether-epoxy resin, alicyclic and aliphatic diepoxy resins and fire resistant bisphenol type epoxy resin. In addition to said compounds to be generally called epoxy resins, vinylcyclohexane dioxide and butadiene dioxide also may be referred to as falling in this class.

Among the compounds having three or more epoxy groups, are novalak epoxy resin, epoxidated unsaturated fatty acid dimers, tetraglycidyl ether, tri-(2,3-epoxypropyl)-isocyanurate.

These epoxy compounds also can be used in combination of two or more thereof as the second reactant.

Said first and second reactants are mixed at room temperature or at a slightly elevated temperature up to 70°C at the highest to form a viscous and homogeneous liquid, whereby any desirable reinforcing agent and filler may be added, which liquid is then subjected to heat treatment at a temperature of 50° to 300°C, more preferably from 130° to 170°C for 2 to 4 hours to be hardened. The hardening treatment is considerably accelerated in the presence of the usual accelerators for hardening epoxy resins such as a tertiary amine so that the reaction may be completed at a temperature of 130° to 170°C in only 5 to 60 minutes.

When heating the viscous liquid to form the synthetic rubber according to the invention, the acid anhydride group of the trimellitoyl moiety of the first reactant reacts with the epoxy group of the second reactant to result in ester formation. During the esterification the three dimensional molecular chain extension cross linking is developed owing to the two or more acid anhydride groups to be highly polymerized, in which large and flexible molecular chains of the first component contribute to the elasticity of the desired elastomer.

The nature and amount of said first and second reactants or components as well as those of the additives such as reinforcing agents and fillers may be varied depending on the desired properties of the elastomer to be manufactured. The elastomer generally contains the first and second components in the respective theoretical amounts but either of them may be used in slight excess. As for the reinforcing agent, carbon black, zinc oxide, magnesium carbonate, silica etc., may be added to the viscous liquid polymer in a suitable amount for improving the tensile strength, shearing strength, abrasion property etc., of the thermosetting elastomer. It is noted that the effect of the nature and amount of the additives on the properties of the synthetic rubber according to the invention is far more remarkable than that on the conventional synthetic rubbers. As for the fillers, the conventionally used ones such as calcium carbonate, talc etc., may be used. The additives may be added in an amount up to 100% relative to the total of said first and second reactants but preferably up to 60%.

According to the invention, hardly any reaction takes place between the first and second reactants at room temperature so that the mixture thereof has considerably long pot life, and owing to the lesser exothermic reaction during the cross-linking reaction generated by the heat treatment the homogeneous elastomer can be obtained in a shorter time and without incurring any deterioration due to the heat. Furthermore, the so-called after-shrinkage of the elastomer is hardly observed owing to the fact that substantially no volatile substances such as water, carbonic acid gas etc., are generated. Both reactants are not toxic and will not be affected by moisture, oxygen, light etc., during the treatment thereof in the natural environment. The viscous liquid not yet subjected to thermal hardening has desirable fluidity for filling in the mold for casting, in view of which in addition to the dimensional stability and mechanical strength of the elastomer to be formed as referred to above it is useful as a casting material, for elastic material and covering material of large dimensions and complex configuration to be used in the industrial field, reactive plasticizer, tire rubber etc. The curing of epoxides according to invention, shall be more definitely explained in the following examples.

EXAMPLE 8

Commercially available cis-polybutadiene JSR-BR 01 (cis-1,4 type 94 – 96 mole % and olefin unsaturated double bond unit 48 weight %) provided by Japan Synthetic Rubber Co., Ltd., was ozonized and then subjected to reduction using $LiAlH_4$ to obtain terminal hydroxyl-functional polybutadiene of 1,520 number average molecular weight and of 2.0 functionality, which was dissolved in benzene together with the chloride of trimellitic anhydride in the mole ratio of 1 to 2.4. The solution was subjected to the reaction with agitation in a nitrogen atmosphere in the presence of pyridine as acid acceptor agent in the mole ratio of 2 to 1 relative to the polybutadiene and at a temperature of $-10°$ to $0°C$ for 3 hours, to obtain the trimellitoyl-functional polymer as represented by the formula referred to above. The number average molecular weight was 2,000 and $n$ in said formula was 2.0. Hydrogen chloride was found as impurity in the amount of 0.01 m mole/100 gr. resulting polymer.

This polymer was mixed with agitation as first reactant with epoxy resin Araldite GY-260 as marketed by Ciba Ltd., Switzerland as second reactant in the equivalent ratio of 0.85 to 1 in a nitrogen atmosphere at room temperature to obtain a light-yellow viscous liquid. This liquid product was poured into a mold of 2mm thickness, after having been sufficiently defoamed in a vacuum, so as to be thermally set at a temperature of 150°C for 3 hours to obtain a rubber-like elastomer. Tensile strength (Tb) 90 $kgr/cm^2$; elongation (Eb) 400%. The tests were carried out on a piece of the elastomer according to DIN No. 3 in 2 mm thickness and by means of the Tensilon tensile tester at room temperature and a velocity of 500 mm/min. The stress-strain curve thereof was very similar to that of the typical vulcanized rubber.

EXAMPLES 9 – 13

The first reactant of said formula was prepared by using emulsion-polymerization polybutadiene (trans-1,4 type 60 mole %, cis-1,4 type 20 mole % and vinyl content 20 mole %; olefin unsaturated double bond unit 48 weight %) according to the process in Example 1. The resulting polymer as first reactant was of 2,850 number average molecular weight and of $n$ being 2.4 and had residual hydrogen chloride in the amount of 0.05 m mole/100 gr. resulting polymer. Epoxy resins to be referred to hereinafter were respectively mixed with said polymer to obtain the corresponding rubber-like elastomers. When using Araldite GY-260 or DER 732 was marketed by Dow Chemical Ltd., in the U.S.A. as second reactant epoxy resin it was previously heated at a temperature of 60°C to 80°C to be melted, and when using Epikote 1004 or Epikote 1007 respectively produced by Shell International Chemicals Corp., in Britain it was previously heated at a temperature of 100° to 160° C to be melted, to which the first reactant was added in a nitrogen atmosphere with agitation. The liquid product was sufficiently defoamed in vacuum and poured into a mold of 1 mm thickness to be hardened at 150°C for 3 hours.

The physical property test results are shown in the following table. The test pieces were prepared according to DIN No. 3 in 1 mm thickness and subjected to the Tensilon tester. Tensile strength and elongation were determined at room temperature and a velocity of 500 mm/min. and shearing or tear strength was determined on the test materials cut in 1.5 mm depth at three points, i.e., the center and the opposite ends of each piece, at room temperature and a velocity of 200 mm/min.

\* Bisphenol A epoxy resin

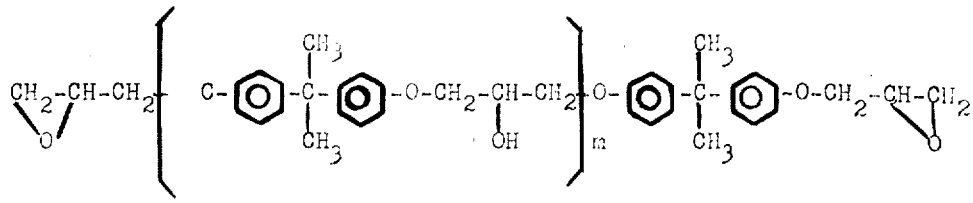

GY-260 n=0; Epikote 1004 n = 3.7; Epikote 1007 n= 6.6

\*\* Polyglycol epoxy resin

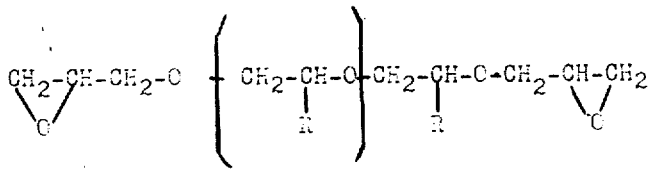

DER 732 ℓ = 5.6

EXAMPLE 14

To 1 equivalent of the trimellitoyl-functional polymer as prepared in Example 9 was added epoxy resin, GY 260 in the amount of 3 equivalents, and further carbon in 30 weight %, triethyl amine as catalyst in 0.5 weight % respectively relative to the total weight of said first and second reactants to be mixed and hardened also as in Example 9. The resulting elastomer had 44.4 kgr/cm² tensile strength Tb, 40% elongation Eb and 4.5 kgr/cm tear strength.

EXAMPLE 15

To 1 equivalent of the first reactant as prepared in Example 9, was added epoxy resin GY-260 (0.5 equivalent) and zinc oxide (0.07 mole) to be mixed and hardened also as in Example 9. The resulting elastomer was of 31.7 kgr/cm² tensile strength, 80% elongation Eb and 1.9 kgr/cm tear strength.

EXAMPLE 16

The first reactant polymer was prepared from styrenebutadiene copolymer rubber (styrene 25 weight %, butadiene-trans 60 mole %, cis 20 mole %, vinyl 20 mole %, olefin unsaturated double bond unit 48 weight %). The resulting polymer was of 2,800 number average molecular weight and n being 2.5 Hydrogen chloride residue was 0.01 m mole/100 gr polymer. The elastomer was manufactured just as in Example 8 except that 1 equivalent of Epikote 1004 was used as the second reactant relative to 0.85 equivalent of the first reactant. Tensile strength Tb 123.6 kgr/cm², elongation Eb 50% and tear strength 10.2 kgr/cm.

What is claimed is:

1. A trimellitoyl functional polymer having the formula

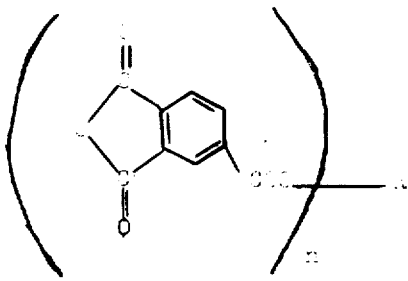

wherein R is a homo- or co-polymeric conjugated diene radical having rubber-like elasticity and having an average molecular weight of 700 to 30,000 and n is an integer of at least 2.

2. A polymer according to claim 1 in which R is the radical of a homopolymer of a conjugated diene or of a copolymer thereof with an α-olefin having two to six carbon atoms, styrene or acrylonitrile.

3. A polymer according to claim 1 in which the diene is butadiene.

4. A process for the manufacture of a functional polymer comprising the steps of ozonizing a polymer selected from the group consisting of homopolymers and copolymers of conjugated dienes, reducing the resulting polymer ozonide to form a hydroxyl-functional polymer having an average molecular weight of 700 to 30,000 and at least two hydroxyl groups and reacting said hydroxyl-functional polymer with a monohalide of trimellitic anhydride.

5. A process as claimed in claim 4, in which the monohalide of trimellitic anhydride is the monochloride of trimellitic anhydride.

6. A process for the manufacture of a functional polymer comprising the steps of ozonizing a polymer selected from the group consisting of homopolymers and copolymers of conjugated dienes, reducing the resulting polymer ozonide to form a hydrozyl-functional polymer having an average molecular weight of 700 to 30,000 and at least two hydroxyl groups and reacting said hydroxyl-functional polymer with a monochloride of trimellitic anhydride in the presence of a tertiary amine at a temperature of −50° to +5°C.

7. A process as claimed in claim 6, in which the monochloride of trimellitic anhydride is reacted with the hydroxyl-functional polymer in the presence of the tertiary amine at a temperature of −30° to −10°C.

8. Process as claimed in claim 4, in which said conjugated diene material of high molecular weight is selected from the group consisting of homopolymers of conjugated dienes having four to eight carbon atoms and copolymers thereof with an α-olefin having two to six carbon atoms, styrene and acrylonitrile.

9. Process as claimed in claim 4, in which said ozonization is carried out in the liquid phase.

10. Process as claimed in claim 9, in which said ozonization is carried out by blowing a gas medium containing ozone through a solution of the starting material high polymer in a solvent inert to ozone and kept at a temperature from room temperature to −80°C.

11. Process as claimed in claim 4, in which said reduction of the polymer ozonide is carried out by using a strong reducing agent selected from the group consisting of lithium hydride, aluminum hydride lithium aluminum hydride and sodium borohydride.

12. Process as claimed in claim 11, in which said reducing agent is added in the excessive amount to a solution of the polymer ozonide in a solvent inert to the reactants which solution is cooled down below the room temperature.

13. Process as claimed in claim 4, in which the monohalide of trimellitic anhydride is reacted with the hydroxyl-functional polymer in the presence of a tertiary amine as acid acceptor.

14. A cured elastomer prepared by mixing (A) at least one trimellitoyl-functional polymer represented by the formula

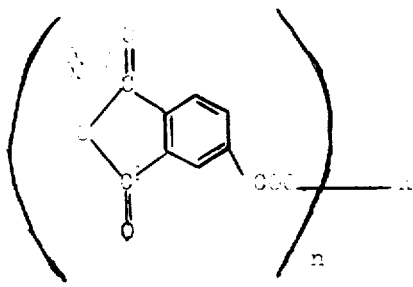

wherein R is a homo- or co-polymeric conjugated diene radical having rubber-like elasticity and having an average molecular weight of 700 to 30,000 and $n$ is an integer of at least 2 with (B) at least one epoxy compound having at least one epoxy group, and heating said mixture at a temperature of 50° to 300°C., to form a cured elastomer, said epoxy compound having a sufficiently high boiling point to prevent evaporation of the epoxy compound during heating of the mixture.

15. A cured elastomer as claimed in claim 14, in which said homopolymer of the conjugated diene is polybutadiene.

16. A cured elastomer as claimed in claim 14, in which said copolymer of the conjugated diene is selected from the group consisting of butadiene-styrene copolymer and butadiene-acrylonitrile copolymer.

17. A cured elastomer as claimed in claim 14, in which said epoxy compound is selected from the group consisting of styrene oxide, butadiene monoxide, epoxy stearate, bisphenol A epoxy resins, polyalkylene ether-epoxy resin, alicyclic and aliphatic diepoxy resins, novolak epoxy resins, epoxidated unsaturated fatty acid dimer, tetraglycidyl ether and tris-(2,3-epoxypropyl)-isocyanurate.

18. A cured elastomer as claimed in claim 14, in which a reinforcing agent and filler are added to the mixture of said (A) and (B) components.

19. A cured elastomer as claimed in claim 18, in which said reinforcing agent and filler are carbon black and zinc oxide, respectively.

20. A cured elastomer as claimed in claim 14, in which a tertiary amine is added as accelerator to the mixture of said (A) and (B) components.

21. A method as claimed in claim 13, in which said tertiary amine is pyridine.

* * * * *

UNITED STATES PATENT OFFICE
CERTIFICATE OF CORRECTION

Patent No. 3,890,284　　　　　　　Dated June 17, 1975

Inventor(s)　Akira Ohnishi et al.　　　Page 1 of 8

It is certified that error appears in the above-identified patent and that said Letters Patent are hereby corrected as shown below:

In the abstract the formula should appear as shown below:

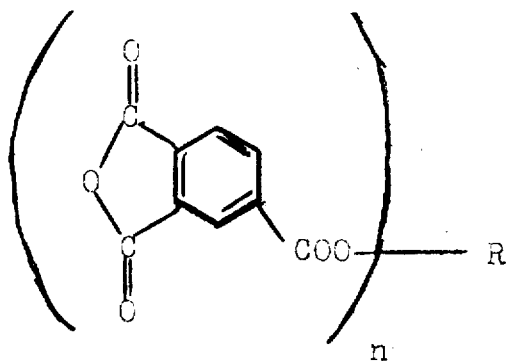

Column 1, lines 53 to 58, the formula should appear as shown below:

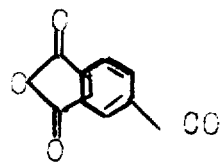

UNITED STATES PATENT OFFICE
CERTIFICATE OF CORRECTION

Patent No. 3,890,284                    Dated June 17, 1975

Inventor(s)    Akira Ohnishi et al.            Page 2 of 8

It is certified that error appears in the above-identified patent and that said Letters Patent are hereby corrected as shown below:

Column 1, lines 63 to 69, the formula should appear as shown below:

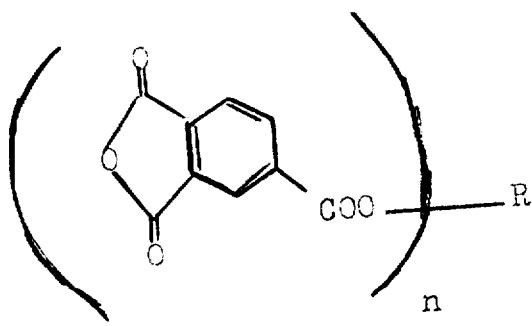

UNITED STATES PATENT OFFICE
CERTIFICATE OF CORRECTION

Patent No. 3,890,284    Dated June 17, 1975

Inventor(s) Akira Ohnishi et al.    Page 3 of 8

It is certified that error appears in the above-identified patent and that said Letters Patent are hereby corrected as shown below:

Columns 3 and 4, the formule should appear as shown below:

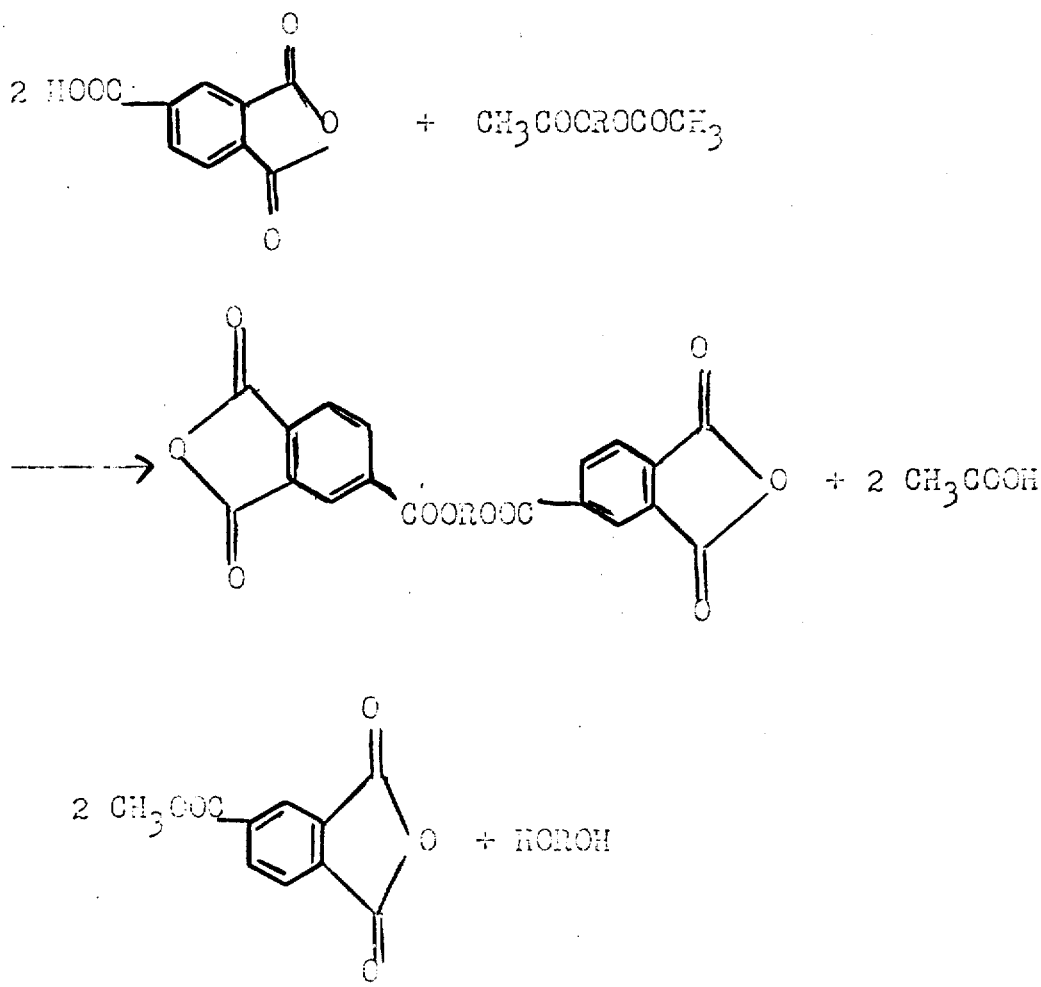

UNITED STATES PATENT OFFICE
CERTIFICATE OF CORRECTION

Patent No. 3,890,284     Dated June 17, 1975

Inventor(s) Akira Ohnishi et al.     Page 4 of 8

It is certified that error appears in the above-identified patent and that said Letters Patent are hereby corrected as shown below:

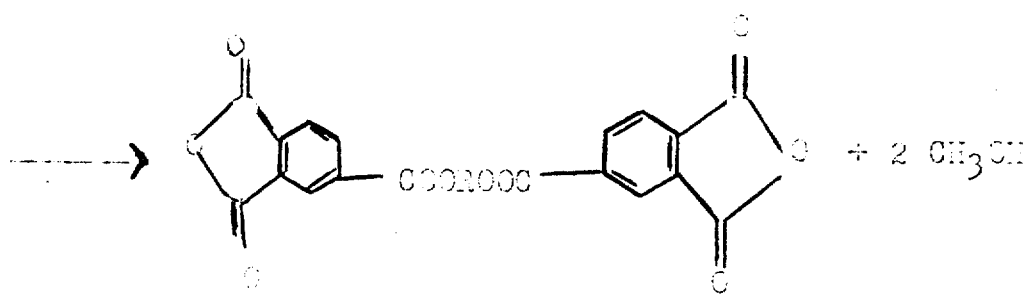

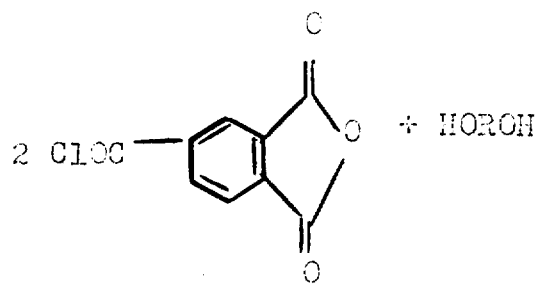

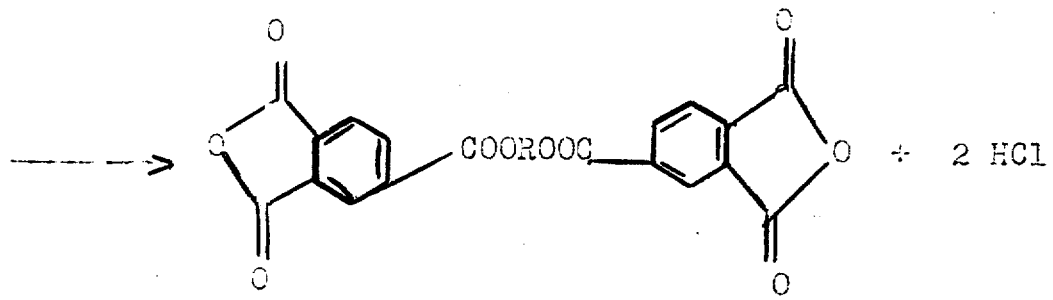

UNITED STATES PATENT OFFICE
CERTIFICATE OF CORRECTION

Patent No. 3,890,284  Dated June 17, 1975

Inventor(s) Akira Ohnishi et al.  Page 5 of 8

It is certified that error appears in the above-identified patent and that said Letters Patent are hereby corrected as shown below:

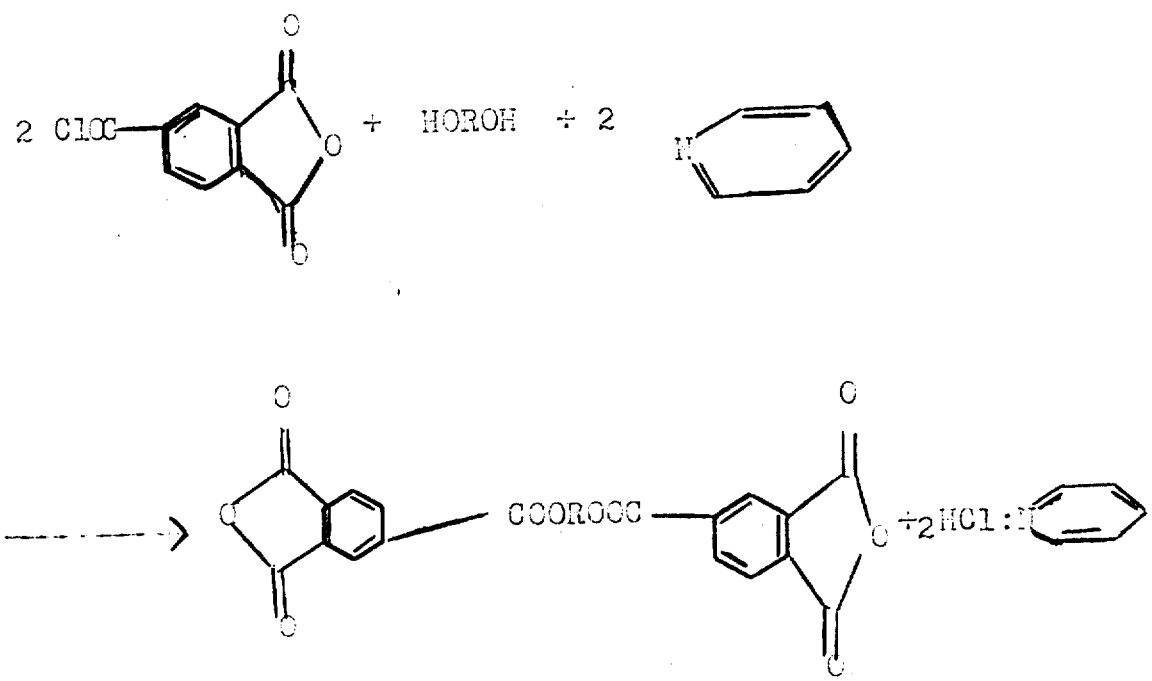

UNITED STATES PATENT OFFICE
CERTIFICATE OF CORRECTION

Patent No. 3,890,284　　　　　　　　　Dated June 17, 1975

Inventor(s) Akira Ohnishi et al.

It is certified that error appears in the above-identified patent and that said Letters Patent are hereby corrected as shown below:

Columns 13 and 14, lines 1 to 17, the formula should appear as shown below:

GY-260 m=0; Epikote 1004 n = 3.7; Epikote 1007 m= 6.6

** Polyglycol epoxy resin

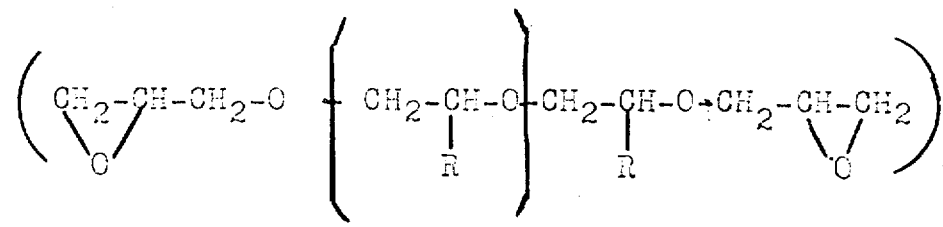

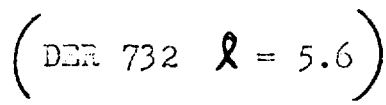

UNITED STATES PATENT OFFICE
CERTIFICATE OF CORRECTION

Patent No. 3,890,284  Dated June 17, 1975

Inventor(s) Akira Ohnishi et al.  Page 7 of 8

It is certified that error appears in the above-identified patent and that said Letters Patent are hereby corrected as shown below:

Column 13, the formula in claim 1, should appear as shown below:

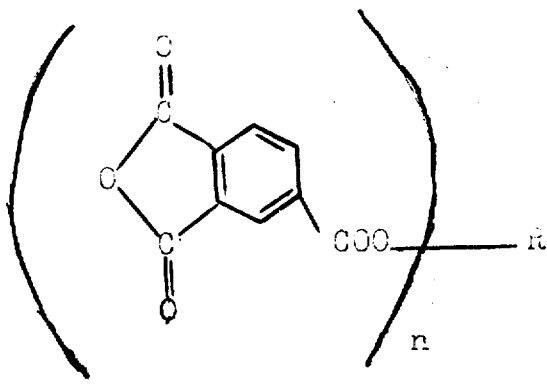

UNITED STATES PATENT OFFICE
CERTIFICATE OF CORRECTION

Patent No. 3,890,284                    Dated June 17, 1975

Inventor(s) Akira Ohnishi et al.

It is certified that error appears in the above-identified patent and that said Letters Patent are hereby corrected as shown below:

Column 15, the formula in claim 14, should appear as shown below:

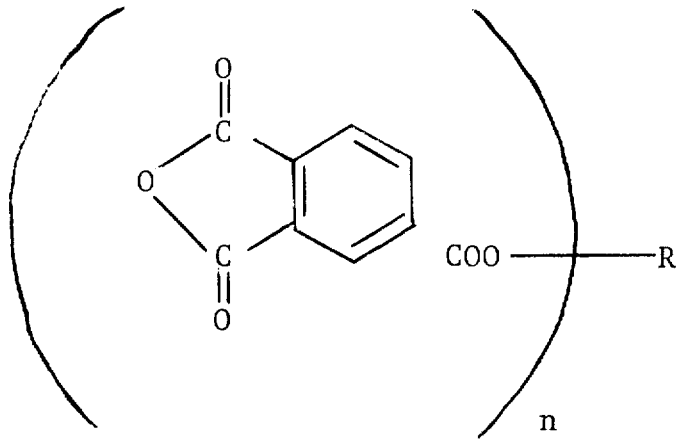

Signed and Sealed this thirteenth Day of April 1976

[SEAL]

Attest:

RUTH C. MASON
Attesting Officer

C. MARSHALL DANN
Commissioner of Patents and Trademarks